(12) United States Patent
Konno et al.

(10) Patent No.: US 10,634,238 B2
(45) Date of Patent: Apr. 28, 2020

(54) CHAIN DRIVE SYSTEM

(71) Applicant: TSUBAKIMOTO CHAIN CO., Osaka-shi, Osaka (JP)

(72) Inventors: Masahiko Konno, Osaka (JP); Kaori Mori, Osaka (JP); Ryo Segawa, Osaka (JP)

(73) Assignee: TSUBAKIMOTO CHAIN CO., Osaka (JP)

(*) Notice: Subject to any disclaimer, the term of this patent is extended or adjusted under 35 U.S.C. 154(b) by 231 days.

(21) Appl. No.: 15/661,278

(22) Filed: Jul. 27, 2017

(65) Prior Publication Data
US 2018/0038476 A1 Feb. 8, 2018

(30) Foreign Application Priority Data
Aug. 3, 2016 (JP) ................... 2016-152845

(51) Int. Cl.
| | |
|---|---|
| *F16H 7/06* | (2006.01) |
| *F16H 57/05* | (2006.01) |
| *F16H 7/18* | (2006.01) |
| *F16H 7/08* | (2006.01) |

(52) U.S. Cl.
CPC .............. *F16H 57/05* (2013.01); *F16H 7/06* (2013.01); *F16H 7/18* (2013.01); *F16H 2007/0872* (2013.01); *F16H 2007/0874* (2013.01); *F16H 2007/0893* (2013.01); *F16H 2007/185* (2013.01)

(58) Field of Classification Search
CPC ........ F16H 7/06; F16H 7/18; F16H 2007/185; F16H 7/08; F16H 2007/0872; F16H 2007/0893; F16H 2007/0874
See application file for complete search history.

(56) References Cited

U.S. PATENT DOCUMENTS

| 6,428,899 B1* | 8/2002 | Fujiwara ................... F16H 7/18 |
| | | 428/221 |
| 2007/0149329 A1* | 6/2007 | Ota ........................ C08L 77/00 |
| | | 474/111 |

(Continued)

FOREIGN PATENT DOCUMENTS

| CN | 104791437 A | 7/2015 |
| JP | 2002122195 A | 4/2002 |

(Continued)

OTHER PUBLICATIONS

JP2005112871 Translation; Maeda, Kurato; Chain Guide; Published: Apr. 28, 2005; Espacenet (Year: 2005).*

*Primary Examiner* — Michael R Mansen
*Assistant Examiner* — Raveen J Dias
(74) *Attorney, Agent, or Firm* — Westerman, Hattori, Daniels & Adrian, LLP

(57) ABSTRACT

An object of the present invention is to provide a chain drive system that can reduce sliding resistance between a chain and a guide shoe, minimize increase of sliding resistance over time, and reduce production cost. Provided is a chain drive system 100 including a plurality of sprockets 101 and 102 over which a chain 130 passes over, and one or more guides 110 and 120 that guide the chain 130. The guides 110 and 120 include integral or separate guide shoes 111 and 121 each having a chain running surface. The chain running surfaces include, in part thereof, a lubricated area 114 where a solid lubricant P is held.

6 Claims, 5 Drawing Sheets

(56) References Cited

U.S. PATENT DOCUMENTS

| | | | | |
|---|---|---|---|---|
| 2011/0251002 A1* | 10/2011 | Mori | ............... | F16H 7/06 |
| | | | | 474/140 |
| 2013/0053197 A1* | 2/2013 | Konno | ............... | F16H 7/18 |
| | | | | 474/140 |
| 2013/0095965 A1* | 4/2013 | Nakagawa | ............... | F16H 7/18 |
| | | | | 474/111 |
| 2013/0210566 A1* | 8/2013 | Konno | ............... | F16H 7/18 |
| | | | | 474/111 |
| 2014/0057749 A1* | 2/2014 | Konno | ............... | F16H 7/18 |
| | | | | 474/111 |
| 2014/0106914 A1* | 4/2014 | Proost | ............... | C10M 149/18 |
| | | | | 474/111 |
| 2015/0204218 A1 | 7/2015 | Utaki | | |
| 2015/0204437 A1* | 7/2015 | Utaki | ............... | F16H 7/18 |
| | | | | 474/91 |
| 2016/0186617 A1* | 6/2016 | Fukutomi | ............... | C09D 163/00 |
| | | | | 123/90.39 |

FOREIGN PATENT DOCUMENTS

| | | |
|---|---|---|
| JP | 2005048786 A | 2/2005 |
| JP | 2005-112871 A | 4/2005 |
| JP | 2007177037 A | 7/2007 |

\* cited by examiner

CHAIN DRIVE SYSTEM

BACKGROUND OF THE INVENTION

1. Field of the Invention

The present invention relates to a chain drive system that includes a plurality of sprockets over which a chain passes over and one or more guides for slidably guiding the chain, the guide having an integral or separate guide shoe that has a chain running surface.

2. Description of the Related Art

Chain drive systems having a guide that guides a running chain and includes an integral or separate guide shoe having a chain running surface for slidably guiding the chain are commonly used to stabilize the chain running between sprockets and to keep an appropriate tension.

It is very desirable that the sliding resistance between the chain and the chain running surface of the guide shoe be small from the viewpoints of noise reduction and drive power loss reduction.

Various measures have been taken such as selecting materials and shapes of the chain and guide shoe, and applying surface treatment and lubricant, etc.

In a chain drive system used for a timing system of a car engine or the like, for example, the chain is made of metal while the guide shoe is made of resin. Various measures such as selection of shapes and materials of the chain and guide shoe, and application of surface treatment are employed, on a precondition that lubricating oil is supplied and the system will be in a high-temperature environment.

High heat resistance, high oil resistance, and small sliding resistance with the chain are required for the guide shoe, and various resin materials suitable for the purpose have been proposed (see Japanese Patent Application Laid-open Nos. 2002-122195 and 2005-048786).

A guide shoe made of a resin material with a solid lubricant added thereto with the aim of reducing the sliding resistance has also been known (see Japanese Patent Application Laid-open No. 2007-177037).

SUMMARY OF THE INVENTION

PTFE-added nylon resin such as the one shown in Japanese Patent Application Laid-open No. 2007-177037 is hard to produce and the production cost is high because of the use of PTFE that is produced by modifying PTFE powder under a special environment. Also, the need to use special equipment poses limitations on the location and amount of production.

Even a small engine normally has one pivot lever guide and one fixed guide, which each includes a guide shoe, so that two guide shoes are necessary.

Larger engines are often provided with more guides, so that a larger number of guide shoes are necessary.

Therefore, when an expensive material such as the one shown in Japanese Patent Application Laid-open No. 2007-177037 is applied for the guide shoes of the timing system of a car engine or the like, the overall cost becomes very high.

Another problem was that when PTFE particles come off of the surface of the guide shoe as the chain slides on the guide shoe, the sliding resistance is increased. The sliding surface of the guide shoe grows irregular as the PTFE particles come off, which further increases the sliding resistance.

Detachment of PTFE particles from the surface of the guide shoe could be minimized by snaking the plate end faces of the sliding chain even flatter by shaving or polishing so as to maintain the effect of lowering the sliding resistance, but this poses the problem of increased production cost.

The present invention solves the problems encountered by known chain drive systems and aims at providing a chain drive system that can reduce the sliding resistance between a chain and a guide shoe, minimize increase of the sliding resistance over time, and lower the production cost.

The present invention provides a chain drive system including a plurality of sprockets over which a chain passes over, and one or more guides that slidably guide the chain, wherein the guide includes an integral or separate guide shoe that has a chain running surface, and the chain running surface includes, in part thereof, a lubricated area where a solid lubricant is held, thereby to solve the problems noted above.

According to the chain drive system as set forth in claim 1, the chain running surface includes, in part thereof, a lubricated area where a solid lubricant is held. This way, the lubricated area for which an expensive material is used can be made as small as possible to reduce the production cost, while the sliding resistance can be sufficiently lowered by setting the lubricated area in an effective location.

The solid lubricant detaching from the surface of the lubricated area of the chain running surface adheres to the chain, whereby the sliding resistance can be reduced also in other parts than the lubricated area.

According to the configuration as set forth in claim 2, the lubricated area is provided to only one of guide shoes of two or more guides, to reduce the number of guide shoes for which an expensive material that leads to a cost increase is used, so that the overall production cost of the chain drive system can further be reduced.

According to the configuration as set forth in claim 3, the lubricated area is provided to only one part of one guide shoe in a chain running direction, to reduce the amount of use of an expensive material that leads to a cost increase, so that the overall production cost of the chain drive system can further be reduced.

According to the configuration as set forth in claim 4, the lubricated area of the guide shoe is made of a polyamide resin with a solid lubricant mixed as an additive in a matrix, so that the material for the lubricated area that leads to a cost increase can be produced relatively inexpensively.

According to the configuration as set forth in claim 5, the lubricated area is formed by applying a coating material on the chain running surface of the guide shoe, and the coating material is made of a polyamide resin with a solid lubricant mixed as an additive in a matrix, so that the amount of use of the material that leads to a cost increase can further be reduced.

According to the configuration as set forth in claim 6, the matrix has a larger elastic modulus than the additive, a lower melting point than the additive, a larger friction coefficient than the additive, a smaller impact resistance than the additive, and a larger mold shrinkage rate than the additive. Therefore, solid lubricant particles largely exposed on the surface of the chain running surface can readily come off. An increase in sliding resistance because of the surface irregularities of the chain running surface after the particle detachment is minimal. Further, detachment of remaining solid lubricant thereafter is minimized.

According to the configuration as set forth in claim 7, the solid lubricant is any one of PTFE, molybdenum disulfide, graphite, polyimide, polyamide-imide, and rubber, or a mixture of two or more thereof. An optimal material can thus be selected in accordance with the material of the chain or the environment of use.

DESCRIPTION OF THE PREFERRED EMBODIMENTS

Embodiment

A chain drive system 100 according to a first embodiment of the present invention will be described with reference to the drawings.

Figure 1:
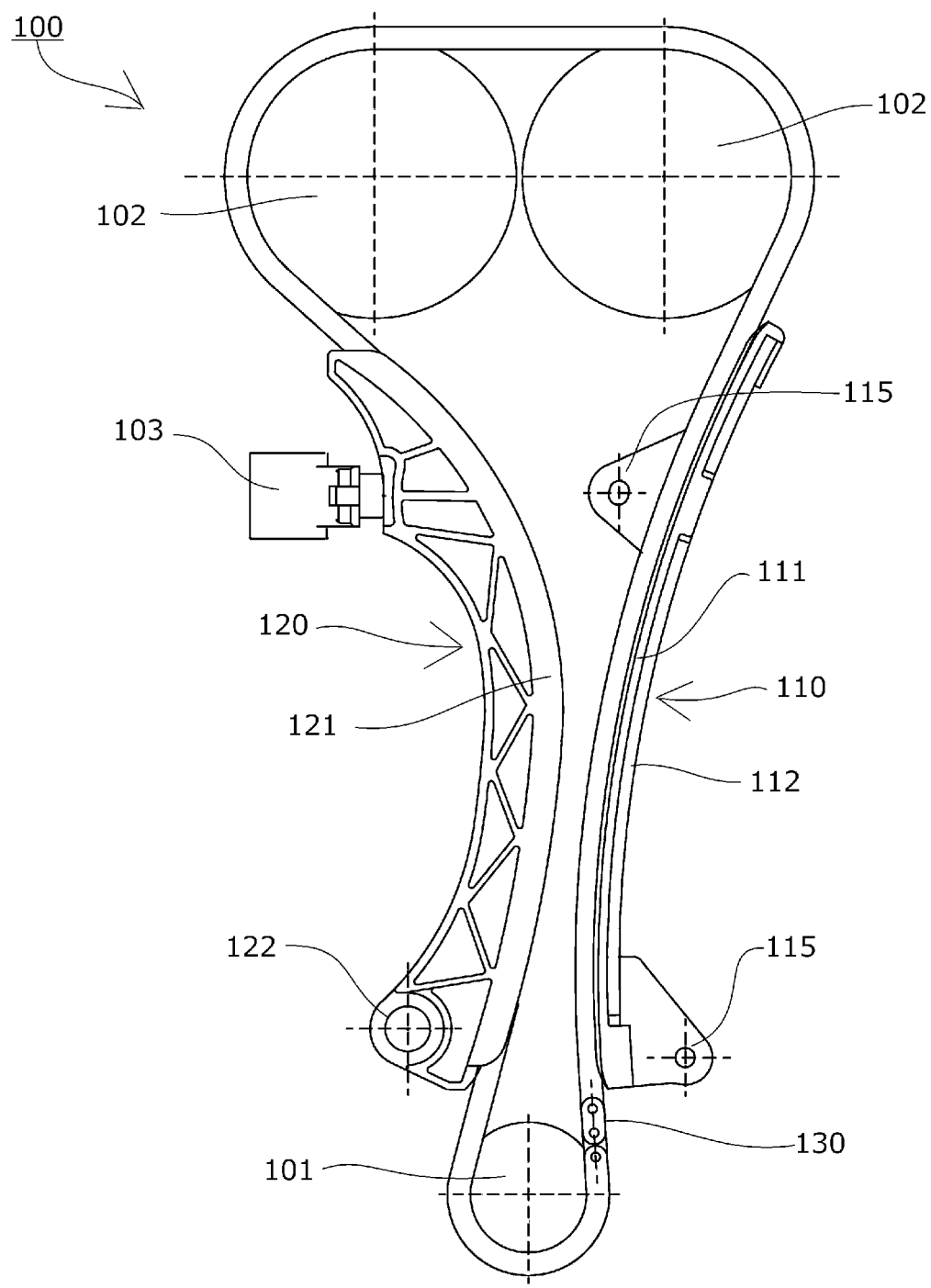
FIG. 1 is an overall view of a chain drive system according to one embodiment of the present invention.

The chain drive system 100 is applied to a timing system of a car engine. As shown in FIG. 1, a chain 130 such as a roller chain passes over a drive sprocket 101 provided to a crankshaft and two driven sprockets 102 provided to two respective camshafts. The chain 130 running between the drive sprocket 101 and the driven sprockets 102 is guided by a fixed guide 110 and a pivot lever guide 120.

The fixed guide 110 includes a guide shoe 111 that has a chain running surface 113 for slidably guiding the running chain, and a base member 112 that supports the guide shoe 111 along the chain running direction. An attachment portion 115 extending from the base member 112 is secured to the engine.

The pivot lever guide 120 is formed integral with a guide shoe 121 that slidably guides the running chain and pivotally attached to the engine at a pivot shaft part 122 on the drive sprocket 101 side. A tensioner 103 provided on the driven sprockets 102 side presses the guide toward the chain 130 to provide a predetermined tension in the chain 130.

The chain running surfaces that make sliding contact with the chain 130 extend substantially entirely in the chain running direction of the guide shoes 111 and 121.

In this embodiment, the guide shoe 111 of the fixed guide 110 and the pivot lever guide 120 integral with the guide shoe 121 are made of a synthetic resin material and formed by injection molding, for example, while the base member 112 of the fixed guide 110 is made of a metal material and formed by punching, bending or other processes from a metal plate, for example.

The chain drive system 100 includes a lubricated area 114 where a solid lubricant is held in part of all the chain running surfaces of the guide shoes 111 and 121.

Figure 2:
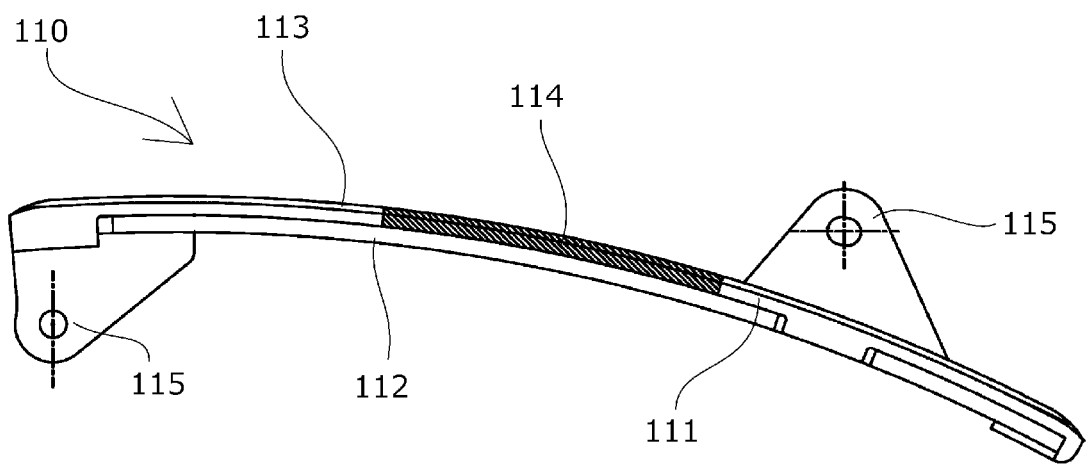
FIG. 2 is a side view of a fixed guide of the chain drive system according to one embodiment of the present invention.

In this embodiment, as shown in FIG. 2, there is a lubricated area 114 where a solid lubricant is held in part of the chain running surface 113 of the guide shoe 111 of the fixed guide 110.

The lubricated area 114 is formed in a middle part in the chain running direction of the fixed guide 110 over about one-third length.

Figure 3:
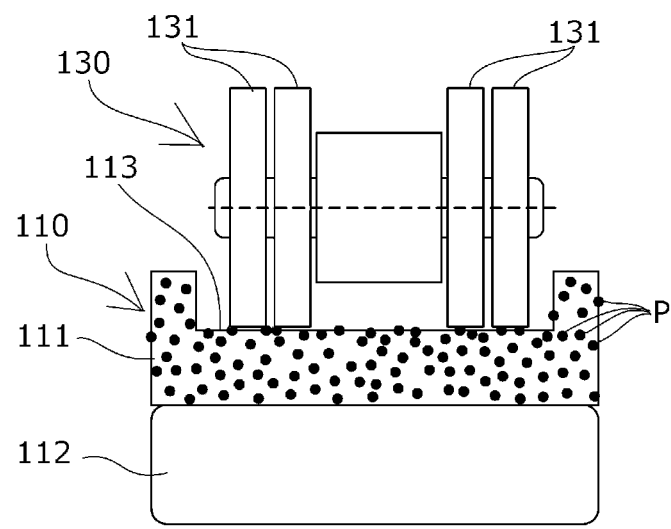
FIG. 3 is a cross-sectional illustrative view of a lubricated area of the fixed guide according to one embodiment of the present invention.

In the lubricated area 114, a solid lubricant P in particle form is mixed in the synthetic resin material of the guide shoe 111 such as to be uniformly dispersed as shown in FIG. 3.

Some of the particles of the solid lubricant P are exposed on the surface of the chain running surface 113 in slidable contact with the chain plates 131 of the chain 130 and function as the lubricant (although the particles are depicted very large for the purpose of explanation, the drawing does not indicate the actual size).

Figure 4:
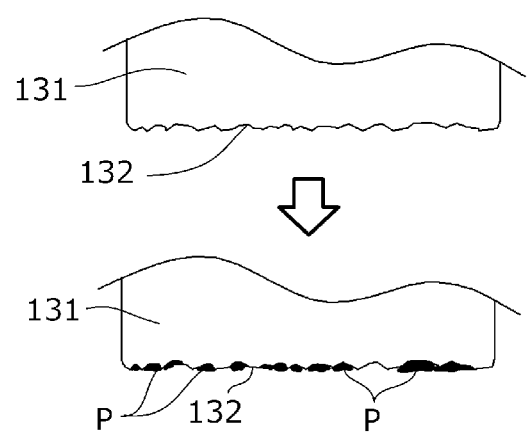
FIG. 4 is an illustrative operation diagram of an end face of a chain plate in sliding contact according to one embodiment of the present invention.

Some of the particles of the solid lubricant P come off of the surface of the chain running surface 113 by the sliding contact with the chain plates 131. The sliding contact end face 132 of the chain plate 131 has minute irregularities as shown in FIG. 4, so that the solid lubricant P that has come off adheres to and is held on the minute irregularities of the sliding contact end face 132.

Thus the lubricating effect is achieved in other parts than the lubricated areas 114 of the guide shoes 111 and 121 due to the solid lubricant P that has adhered to and is held on the sliding contact end face 132, to help reduce the sliding resistance.

Figure 5:
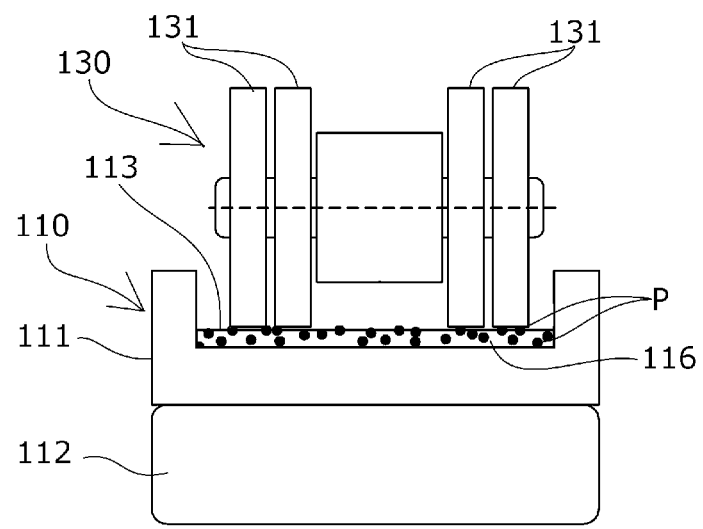
FIG. 5 is a cross-sectional illustrative view of a lubricated area of the fixed guide according to another embodiment of the present invention.

The lubricated area 114 is preferably provided by two material injection molding whereby different materials are molded into one part, for example, when fabricating the guide shoe 111. Alternatively, a part with the chain running surface 113 that will form the lubricated area 114 and another part of the guide shoe 111 may be separately molded and fitted with each other thereafter, and joined together by known means such as fusion bonding. The lubricated area 114 may also be provided by applying a coating layer 116, which is composed of a synthetic resin material and a solid lubricant P mixed therein, to an area of the guide shoe 111 that makes sliding contact with the chain 130, as shown in FIG. 5.

This design allows the main body of the guide shoe 111 to be made of a single material so that the production cost will be reduced. The effect similar to that of the embodiment shown in FIG. 3 can be achieved while the amount of use of the synthetic resin with the solid lubricant P mixed therein, which causes a cost increase, is reduced to lower the production cost.

In the embodiment described above, the lubricated area 114 is formed in a middle part of the guide shoe 111 of the fixed guide 110. According to the present invention, however, the lubricated area need only be formed in part of all the chain running surfaces of all the guide shoes in the chain drive system. For example, the lubricated area may be formed on the entire chain running surface 113 of the guide shoe 111 of the fixed guide 110, while the lubricated area may not be formed on the guide shoe 121 of the pivot lever guide 120, as in the embodiment described above.

Conversely, the lubricated area may be formed on the guide shoe 121 of the pivot lever guide 120, while it may not be formed on the guide shoe 111 of the fixed guide 110.

Alternatively, a lubricated area may be formed in part of each of the guide shoe 111 of the fixed guide 110 and the guide shoe 121 of the pivot lever guide 120. Even if there are three or more chain guide members, so long as the lubricated area is formed in part of all the chain running surfaces of all the guide shoes in the chain drive system, the position, number, and length of the lubricated area can be designed suitably.

The resin that constitutes the matrix, and the solid lubricant as an additive, for providing the lubricated area, the ratio of these components, and the production method may be selected from known techniques. Preferably, though, polyamide resin can be used as the matrix, whereby the heat resistance and oil resistance required in applications for the timing system of a car engine or the like can be achieved, and also the matrix itself will have a smaller sliding resistance with the chain.

A good balance between detachment and retention of solid lubricant on the surface is important, because it is intended to achieve a lubrication effect in parts other than the lubricated area with the detached solid lubricant adhering to and being held on fine irregularities on the sliding contact end face of the chain plate.

Issues that further need to be considered include minimization of an increase in sliding resistance of the matrix where the solid lubricant has come off, and optimization of the amount of further detachment of the solid lubricant due to wear.

The material composition can be designed suitably from these viewpoints by optimizing the relationship between the properties of the matrix and the additive that will be the solid lubricant. The matrix should preferably have a larger elastic modulus, a lower melting point, a larger friction coefficient, and a smaller impact resistance than the additive, as well as a larger mold shrinkage rate than the additive.

The ideal solid lubricant differs depending on the environment of use of the chain drive system, the material of the chain and others. For the chain drive system used in the timing system of a car engine or the like where lubricating oil is supplied and which is a high-temperature environment, the solid lubricant should preferably be one of PTFE, molybdenum disulfide, graphite, polyimide, polyamide-imide, and rubber, or a mixture of two or more of these.

While the chain drive system of the embodiment described above is supposed to be used in a timing system of a car engine or the like, the application is not limited to this and the system is applicable to various equipment.

While the embodiment is applied to a chain drive system, it can be applied to similar drive systems such as belts and ropes with similar materials and sliding contact conditions, and is applicable in various industrial fields.

What is claimed is:

1. A chain drive system comprising:
   a plurality of sprockets over which a chain passes over; and
   one or more guides for guiding the chain,
   each of the one or more guides including an integral or separate guide shoe having a chain running surface,
   the chain running surface of at least one of the one or more guides including, in part thereof, a lubricated area where a solid lubricant is held,
   the lubricated area is provided to only one part of one guide shoe in a chain running direction.

2. The chain drive system according to claim 1, wherein the lubricated area is provided to only one of guide shoes of two or more guides.

3. The chain drive system according to claim 1, wherein the lubricated area is made of a polyamide resin with a solid lubricant mixed as an additive in a matrix.

4. The chain drive system according to claim 3,
   wherein the matrix has a larger elastic modulus than the additive,
   wherein the matrix has a lower melting point than the additive,
   wherein the matrix has a larger friction coefficient than the additive,
   wherein the matrix has a smaller impact resistance than the additive, and
   wherein the matrix has a larger mold shrinkage rate than the additive.

5. The chain drive system according to claim 1, wherein the lubricated area is formed by applying a coating material on the chain running surface of the guide shoe, and
   the coating material is made of a polyamide resin with a solid lubricant mixed as an additive in a matrix.

6. The chain drive system according to claim 1, wherein the solid lubricant is any one of PTFE, molybdenum disulfide, graphite, polyimide, polyamide-imide, and rubber, or a mixture of two or more thereof.

* * * * *